(12) United States Patent
Tsutsumi et al.

(10) Patent No.: US 11,016,928 B2
(45) Date of Patent: May 25, 2021

(54) MICROCOMPUTER AND LOGIC CIRCUIT

(71) Applicant: HITACHI AUTOMOTIVE SYSTEMS, LTD., Hitachinaka (JP)

(72) Inventors: Satoshi Tsutsumi, Tokyo (JP); Taisuke Ueta, Tokyo (JP); Shuhei Kaneko, Hitachinaka (JP); Kenichi Osada, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 44 days.

(21) Appl. No.: 16/473,473

(22) PCT Filed: Oct. 12, 2017

(86) PCT No.: PCT/JP2017/037033
§ 371 (c)(1),
(2) Date: Jun. 25, 2019

(87) PCT Pub. No.: WO2018/123205
PCT Pub. Date: Jul. 5, 2018

(65) Prior Publication Data
US 2019/0370220 A1    Dec. 5, 2019

(30) Foreign Application Priority Data

Dec. 27, 2016 (JP) .............................. JP2016-252782

(51) Int. Cl.
*G06F 9/22* (2006.01)
*G06F 15/78* (2006.01)
(Continued)

(52) U.S. Cl.
CPC ................ *G06F 15/78* (2013.01); *G06F 1/24* (2013.01); *G06F 9/32* (2013.01); *G06F 12/126* (2013.01);
(Continued)

(58) Field of Classification Search
CPC ..... G06F 9/22; G06F 1/24; G06F 9/32; G06F 12/126; G06F 15/78; H04L 12/40
See application file for complete search history.

(56) References Cited

U.S. PATENT DOCUMENTS 7,304,493 B2 * 12/2007 Goodnow ............ H03K 19/177
326/16
10,044,564 B2 * 8/2018 Likkei ................. H04L 41/0816
(Continued)

FOREIGN PATENT DOCUMENTS

GB         2439579 A  *  1/2008   ............. G06F 30/34
JP      2007-507034 A      3/2007
(Continued)

OTHER PUBLICATIONS

Kitani et al. "Development of Data Communication Method In-Vehicle Network for Automated Driving", IPSJ SIG Technical Reports Digital Contents Creation, Jan. 14, 2016, vol. 2016-DCC-12, No. 21, pp. 1-8 with English Abstract.
(Continued)

*Primary Examiner* — Cheng Yuan Tseng
(74) *Attorney, Agent, or Firm* — Volpe Koenig

(57) ABSTRACT

A microcomputer is connected to a logic circuit. The microcomputer includes a monitoring unit monitoring the state of the logic circuit, a storage unit storing a plurality of information processing items executed by the microcomputer, and a processing unit executing a process on the basis of the state of the logic circuit and at least one information processing item selected from the plurality of information processing items on the basis of a communication frame inputted to the microcomputer.

6 Claims, 11 Drawing Sheets

(51) Int. Cl.
    *G06F 1/24*     (2006.01)
    *G06F 9/32*     (2018.01)
    *G06F 12/126*     (2016.01)
    *H04L 12/40*     (2006.01)

(52) U.S. Cl.
    CPC .... *H04L 12/40* (2013.01); *H04L 2012/40215* (2013.01)

(56) References Cited

U.S. PATENT DOCUMENTS

| | | |
|---|---|---|
| 2005/0081115 A1 | 4/2005 | Cheng et al. |
| 2010/0216498 A1 | 8/2010 | Mintah et al. |
| 2014/0156120 A1* | 6/2014 | Deitz ............ B61C 17/12 701/19 |

FOREIGN PATENT DOCUMENTS

| | | |
|---|---|---|
| JP | 2008-191730 A | 8/2008 |
| JP | 2011-013829 A | 1/2011 |

OTHER PUBLICATIONS

International Search Report dated Jan. 16, 2018 for the International PCT Application No. PCT/JP2017/037033.
Extended European Search Report dated Jul. 24, 2020 for European Patent Application No. 17887882.3.

* cited by examiner

FIG. 3

| | | FLOW TABLE | |
|---|---|---|---|
| CAN ID | OUTPUT PORT | INFORMATION PROCESSING ITEM | |
| 10 | SECOND CAN IF | RELAY + DECODING (OFFLOAD) | ~310 |
| 20 | FPGA | RELAY | ~311 |
| 30 | FIRST CAN IF | RELAY + ENCODING (OFFLOAD) | ~312 |
| 40 | FIRST CAN IF | RELAY + ENCODING | ~313 |

FIG. 4

| | 401 | 253 | 402 | 403 | |
|---|---|---|---|---|---|
| | \| | \| | \| | \| | |
| | | | FDB | | |
| | DESTINATION MAC ADDRESS | | OUTPUT PORT | PROCESSING CONTENTS | |
| | 00:11:11:11:11:11 | | FIRST ETHERNET IF | RELAY | ~410 |
| | 00:22:22:22:22:22 | | SECOND ETHERNET IF | RELAY | ~411 |
| | 00:33:33:33:33:33 | | MICROCOMPUTER | RELAY | ~412 |
| | 00:44:44:44:44:44 | | MICROCOMPUTER | OFFLOAD (FILTERING) | ~413 |

FIG. 5

| CONVERSION DB 254 | |
|---|---|
| CAN ID 501 | DESTINATION MAC ADDRESS 502 |
| 10 | 00:22:22:22:22:22 | 510
| 30 | 00:44:44:44:44:44 | 511

FIG. 10

| CAN ID | PRIORITY |
|---|---|
| 10 | 0 |
| 20 | 10 |
| 30 | 40 |
| 40 | 50 |

PRIORITY DB

MICROCOMPUTER AND LOGIC CIRCUIT

TECHNICAL FIELD

The present invention relates to a microcomputer and a logic circuit.

BACKGROUND ART

A constitution in which a microcomputer and a logic circuit are combined has been known. Since the microcomputer and the logic circuit have different times required from the turning-on of the power supply to the completion of initialization, for example, measures as disclosed in Patent Literature 1 are implemented.

Patent Literature 1 discloses an electronic apparatus having a functioning unit performing configuration that writes circuit data after a power supply is turned on for start-up and serving a circuit function according to the circuit data after the completion of the configuration, a first microcomputer started up substantially simultaneously with the functioning unit, performing initialization that reads an initial program after the start-up, and starting communication with the functioning unit after the completion of the initialization, and a configuration monitoring unit resetting the first microcomputer after the start-up of the first microcomputer, and after the completion of the configuration by the functioning unit, releasing the reset to allow the first microcomputer to start the initialization.

CITATION LIST

Patent Literature

Patent Literature 1: Japanese Unexamined Patent Application Publication No. 2008-191730

SUMMARY OF INVENTION

Technical Problem

In the invention described in Patent Literature 1, the operation of the microcomputer cannot be decided on the basis of the state of the logic circuit.

Solution to Problem

A microcomputer according to a first aspect of the present invention is the microcomputer connected to a logic circuit. The microcomputer includes a monitoring unit monitoring the state of the logic circuit, a storage unit storing a plurality of information processing items executed by the microcomputer, and a processing unit executing a process on the basis of the state of the logic circuit and at least one information processing item selected from the plurality of information processing items on the basis of a communication frame inputted to the microcomputer.

A logic circuit according to a second aspect of the present invention is connected to the microcomputer.

Advantageous Effects of Invention

According to the present invention, the process of the microcomputer can be decided on the basis of the state of the logic circuit.

BRIEF DESCRIPTION OF DRAWINGS

FIG. 3 is a diagram illustrating an example of a flow table.

FIG. 4 is a diagram illustrating an example of an FDB.

FIG. 5 is a diagram illustrating an example of a conversion DB.

FIG. 10 is a diagram illustrating an example of a priority DB.

DESCRIPTION OF EMBODIMENTS

First Embodiment

A first embodiment of an on-vehicle system will be described below with reference to FIGS. 1 to 8.

Figure 1:
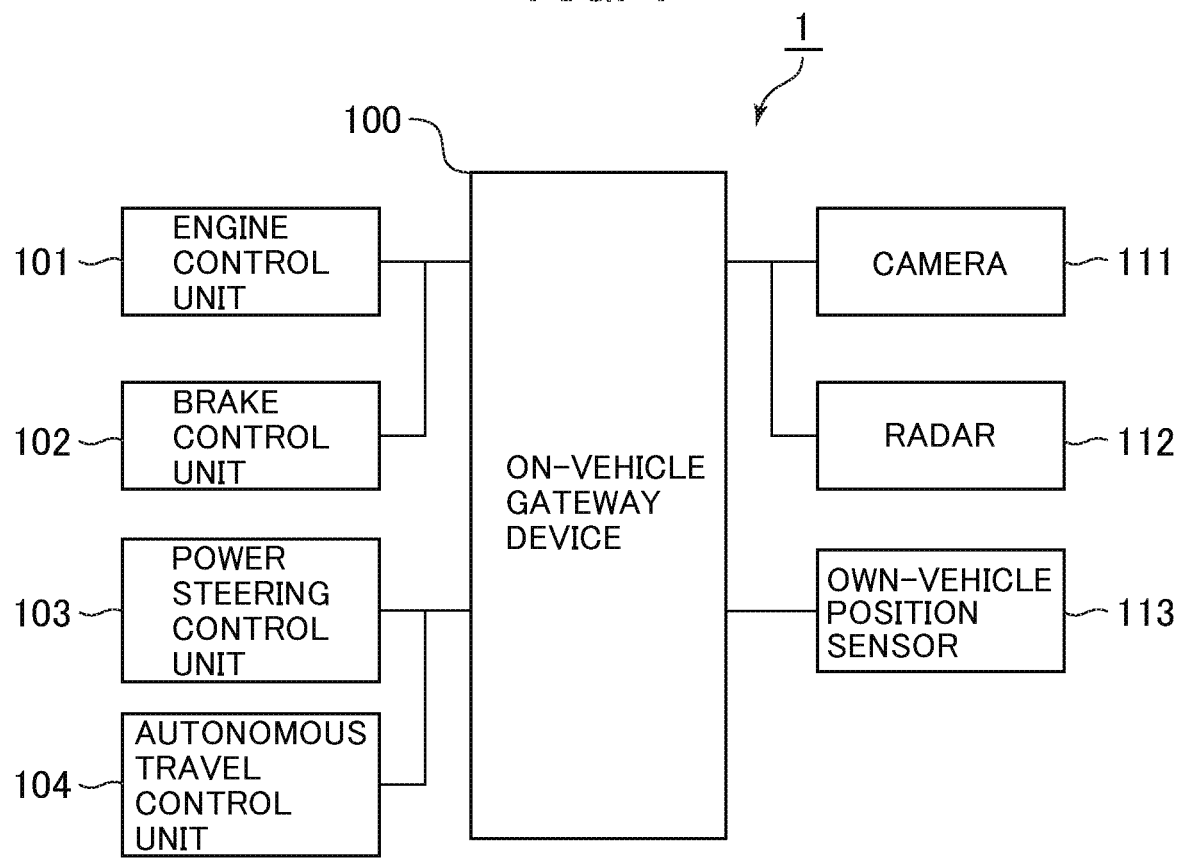
FIG. 1 is a diagram illustrating the overview of an on-vehicle system.

FIG. 1 is a diagram illustrating the overview of an on-vehicle system 1. The on-vehicle system 1 includes an on-vehicle gateway device 100, an engine control unit 101, a brake control unit 102, a power steering control unit 103, an autonomous travel control unit 104, a camera 111, a radar 112, and an own-vehicle position sensor 113. The engine control unit 101, the brake control unit 102, the power steering control unit 103, and the autonomous travel control unit 104 are connected to the on-vehicle gateway device 100 by CAN (Controller Area Network). The camera 111, the radar 112, and the own-vehicle position sensor 113 are connected to the on-vehicle gateway device 100 by IEEE802.3, that is, Ethernet (registered trademark).

The engine control unit 101 is a controller that controls an engine that generates the driving force of a vehicle. The brake control unit 102 is a controller that performs the brake control (braking force control) of the vehicle. The power steering control unit 103 is a controller that controls the power steering of the vehicle. The camera 111, the radar 112, and the own-vehicle position sensor 113 are outside recognition sensors for recognizing the outside state of the vehicle.

The on-vehicle gateway device 100 accommodates the CAN having a plurality of channels and the Ethernet having a plurality of ports, and performs, in addition to the CAN communication relay between the different channels and the Ethernet communication relay between the different ports, the communication relay from the CAN to the Ethernet and the communication relay from the Ethernet to the CAN. During the communication relay from the CAN to the Ethernet, the CAN frame is encapsulated by the Ethernet frame, and is relayed. During the communication relay from the Ethernet to the CAN, the CAN frame encapsulated by the Ethernet frame is taken out by decapsulation, and is relayed. For example, the sensor information from the camera 111, the radar 112, and the own-vehicle position sensor 113 is relayed to the autonomous travel control unit 104 by the on-vehicle gateway device 100. Also, the steering information from the power steering control unit 103 is relayed to the own-vehicle position sensor 113 by the on-vehicle gateway device 100.

Figure 2:
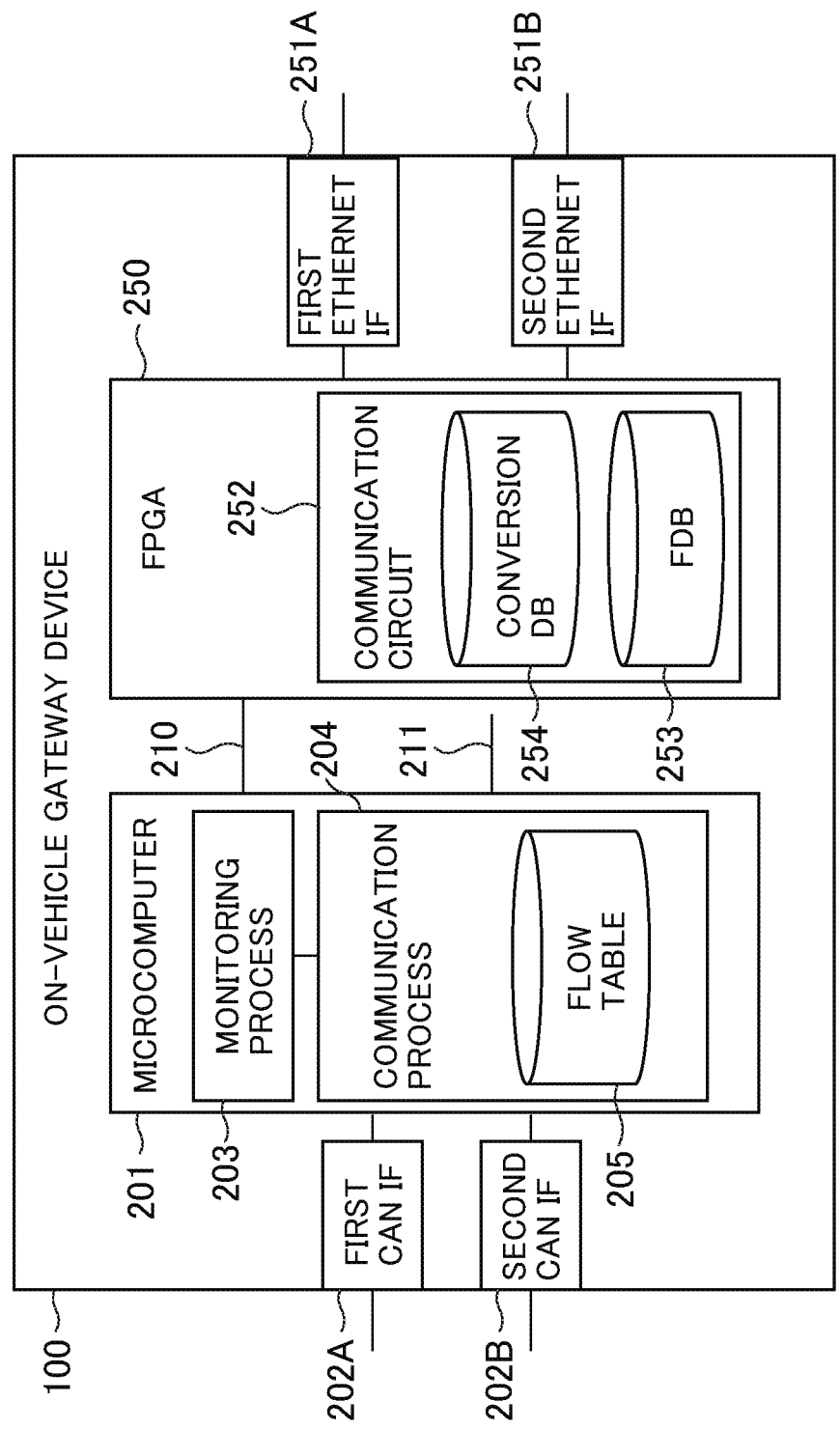
FIG. 2 is a block diagram of an on-vehicle gateway device according to a first embodiment.

FIG. 2 is a block diagram of the on-vehicle gateway device 100. The on-vehicle gateway device 100 includes a microcomputer (hereinafter, called a "microcomputer") 201, a first CAN IF 202A, a second CAN IF 202B, an FPGA (Field-Programmable Gate Array) 250, a first Ethernet IF 251A, and a second Ethernet IF 251B. The microcomputer 201 is connected to the first CAN IF 202A and the second CAN IF 202B. The FPGA 250 is connected to the first Ethernet IF 251A and the second Ethernet IF 251B. In this embodiment, the microcomputer 201 and the FPGA 250 are independent members, each of the microcomputer 201 and the FPGA 250 is accommodated in a different package, and each of the microcomputer 201 and the FPGA 250 can be independently distributed. To function as the on-vehicle gateway device 100, the microcomputer 201 and the FPGA 250 are physically connected by a wire, a pin and socket, a cable, and the like.

The microcomputer 201 includes a CPU, a ROM, and a RAM. In the RAM, a storage area for standby that temporarily stores the received communication frame is secured. The CPU of the microcomputer 201 to which a power supply voltage is applied copies the program stored in the ROM to the RAM to execute the program. Hereinafter, developing the program stored in the ROM to the RAM by the CPU of the microcomputer 201 to execute the program is called "the initialization of the microcomputer 201". That is, when the initialization is completed, the microcomputer 201 can exhibit the function achieved by the program. The microcomputer 201 also includes a nonvolatile memory, and records the log into the nonvolatile memory, as described later.

The FPGA 250 is a programmable logic circuit that includes a volatile SRAM. The electric power is supplied, then, the FPGA 250 reads the program file into the SRAM to constitute the logic circuit. Hereinafter, reading the program file by the FPGA 250 to constitute the logic circuit is called "the configuration of the FPGA 250" or "the initialization of the FPGA 250". Also, hereinafter, the "configuration" is sometimes called "config". The FPGA 250 cannot exhibit the later-described function until the configuration is completed.

The time required for the configuration of the FPGA 250 is longer than the time required for the initialization of the microcomputer 201. When applied to the on-vehicle gateway device 100, the power supply voltage is applied to both of the microcomputer 201 and the FPGA 250 substantially simultaneously, so that the configuration of the FPGA 250 is completed after the initialization of the microcomputer 201 is completed. Therefore, the microcomputer 201 starts to operate earlier than the FPGA 250.

The microcomputer 201 and the FPGA 250 are connected by a monitoring bus 210 and a data bus 211. The monitoring bus 210 and the data bus 211 are, for example, wires and contacts. It should be noted that each of the number of the CAN IFs and the number of the Ethernet IFs is not limited to two, and each of the number of the CAN IFs and the number of the Ethernet IFs is at least one. Also, the communication standards may be other standards, such as FlexRay (registered trademark) and LIN (registered trademark). Further, any apparatuses may be connected to each network, and at least one apparatus is connected to each network. The communication between the CAN and the Ethernet is relayed between the microcomputer 201 and the FPGA 250 via the data bus 211, and is transmitted from the destination network interface.

The microcomputer 201 includes, as its functions, a monitoring process 203 and a communication process 204, the communication process 204 including a flow table 205. The monitoring process 203 monitors the state of the FPGA 250, that is, the configuration state, the failure state, and the like, through the monitoring bus 210, and determines in what state the FPGA 250 is. For example, the monitoring process 203 monitors, via the monitoring bus 210, the state of the pin that is included in the FPGA 250 and represents the completion of the configuration, and determines, when the voltage level of the pin exceeds a predetermined threshold value, that the configuration has been completed.

The communication process 204 processes the communication frame inputted from each of the first CAN IF 202A and the second CAN IF 202B to the microcomputer 201 on the basis of the flow table 205. The constitution of the flow table 205 will be described later. Also, the communication process 204 transfers the CAN frame outputted from the FPGA 250 to each of the first CAN IF 202A and the second CAN IF 202B. The process executed by the communication process 204 includes large-load processes, such as a filtering process that discards a frame having a particular pattern, an encoding process, and a decoding process. Some of these large-load processes are sometimes executed by the FPGA 250, as described later. In this embodiment, allowing the FPGA 250 to execute the process originally executed by the microcomputer 201 is called "offload".

The FPGA 250 includes a communication circuit 252, the communication circuit 252 including a forwarding database (hereinafter, called an "FDB") 253, and a conversion DB 254. The constitutions of the FDB 253 and the conversion DB 254 will be described later. The communication circuit 252 executes the switching process of the Ethernet, the CAN-Ethernet conversion process that is the relay of the CAN and the Ethernet, and further, the offload that executes some processes of the communication process 204. The communication frame inputted from each of the first Ethernet IF 251A and the second Ethernet IF 251B to the FPGA 250 is processed on the basis of the FDB 253 by the communication circuit 252.

During the CAN-Ethernet conversion process that encapsulates the CAN frame by the Ethernet frame, the communication circuit 252 refers to the conversion DB 254 to generate the header of the Ethernet frame. That is, an MAC address is designated on the basis of the CAN ID of the CAN frame, and the header of the Ethernet frame in which the designated MAC address is stored is then generated. It should be noted that although the CAN-Ethernet conversion process may be executed by the microcomputer 201, the CAN-Ethernet conversion process that is executed by the FPGA 250 can be performed for a shorter time.

The FPGA 250 further includes a failure detection circuit, not illustrated, detecting the failure of the FPGA 250 itself. When detecting a failure, the failure detection circuit transmits the occurrence of the failure to the microcomputer 201 via the monitoring bus 210. It should be noted that examples of the cause of the failure occurring in the FPGA 250 include a soft error caused by radiation, operation failure due to the lowering of the power supply, damage due to latch-up, and the like.

The flow table FIG. 3 is a diagram illustrating an example of the flow table 205. The flow table 205 includes a plurality of records having three fields. The fields that the flow table 205 has are a CAN ID 301, an output port 302, and an information processing item 303. The CAN ID 301 represents the CAN ID included in the header of the CAN frame inputted from each of the first CAN IF 202A and the second CAN IF 202B. The output port 302 represents the port for output from the microcomputer 201. The information processing item 303 represents the process executed by the communication process 204. However, the item described as the "offload" is allowed to be executed by the FPGA 250.

The first record indicated by the reference numeral 310 represents that when the CAN frame in which the CAN ID is "10" is inputted, the decoding process is allowed to be executed by the FPGA 250 to output the CAN frame to the second CAN IF 202B. The second record indicated by the reference numeral 311 represents that when the CAN frame in which the CAN ID is "20" is inputted, the CAN frame is outputted to the FPGA 250. The third record indicated by the reference numeral 312 represents that when the CAN frame in which the CAN ID is "30" is inputted, the encoding process is allowed to be executed by the FPGA 250 and the CAN frame is outputted to the first CAN IF 202A. The fourth record indicated by the reference numeral 313 represents that when the CAN frame in which the CAN ID is "40" is inputted, the communication process 204 itself executes the encoding process to output the CAN frame to the first CAN IF 202A.

The forwarding database FIG. 4 is a diagram illustrating an example of the FDB 253. The FDB 253 includes a plurality of records having three fields. The fields that the FDB 253 has are a destination MAC address 401 included in the Ethernet frame, an output port 402 that represents the port for output from the FPGA 250, and processing contents 403 in which the processing contents with respect to the communication frame are described.

The first record indicated by the reference numeral 410 represents that when the Ethernet frame in which the destination MAC address 401 is "00:11:11:11:11:11" is inputted, the communication circuit 252 relays the Ethernet frame to the first Ethernet IF 251A. The second record indicated by the reference numeral 411 represents that when the Ethernet frame in which the destination MAC address 401 is "00:22:22:22:22:22" is inputted, the communication circuit 252 relays the Ethernet frame to the second Ethernet IF 251B. The third record indicated by the reference numeral 412 represents that when the Ethernet frame in which the destination MAC address 401 is "00:33:33:33:33:33" is inputted, the communication circuit 252 relays the Ethernet frame to the microcomputer 201. The fourth record indicated by the reference numeral 413 represents that when the Ethernet frame in which the destination MAC address 401 is "00:44:44:44:44:44" is inputted, the communication circuit 252 performs the filtering process to relay the Ethernet frame to the microcomputer 201.

The Conversion DB

Figure 5:
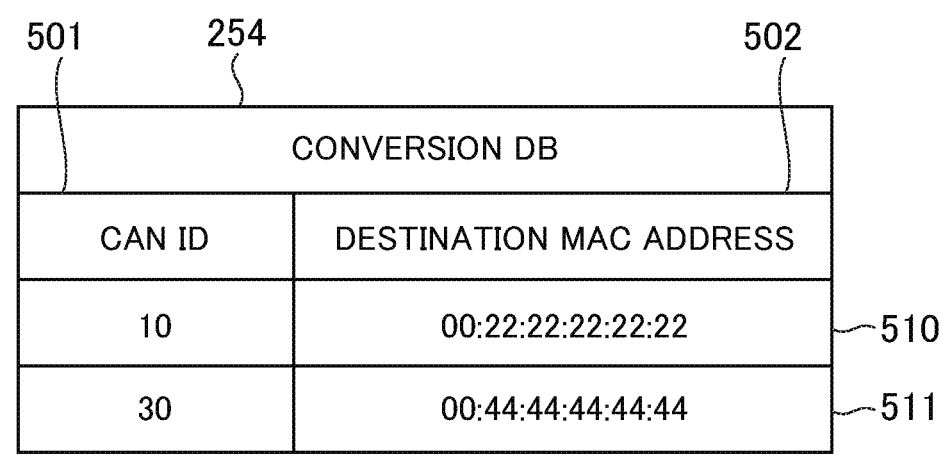

FIG. 5 is a diagram illustrating an example of the conversion DB 254. The conversion DB 254 includes a plurality of records having two fields of a CAN ID 501 and a destination MAC address 502. The conversion DB 254 is referred to when the CAN frame is encapsulated into the Ethernet frame.

The first record indicated by the reference numeral 510 represents that when the CAN frame in which the CAN ID is "10" is inputted, the CAN frame is encapsulated into the Ethernet frame in which the destination MAC address is "00:22:22:22:22:22". The second record indicated by the reference numeral 511 represents that when the CAN frame in which the CAN ID is "30" is inputted, the CAN frame is encapsulated into the Ethernet frame in which the destination MAC address is "00:44:44:44:44:44". It should be noted that other information necessary for the encapsulation, that is, the transmission source address, the EtherType, and the like, take a method for setting such the information from the outside to the internal register of the communication circuit 252.

A flowchart illustrating the operation of the microcomputer

Figure 6:
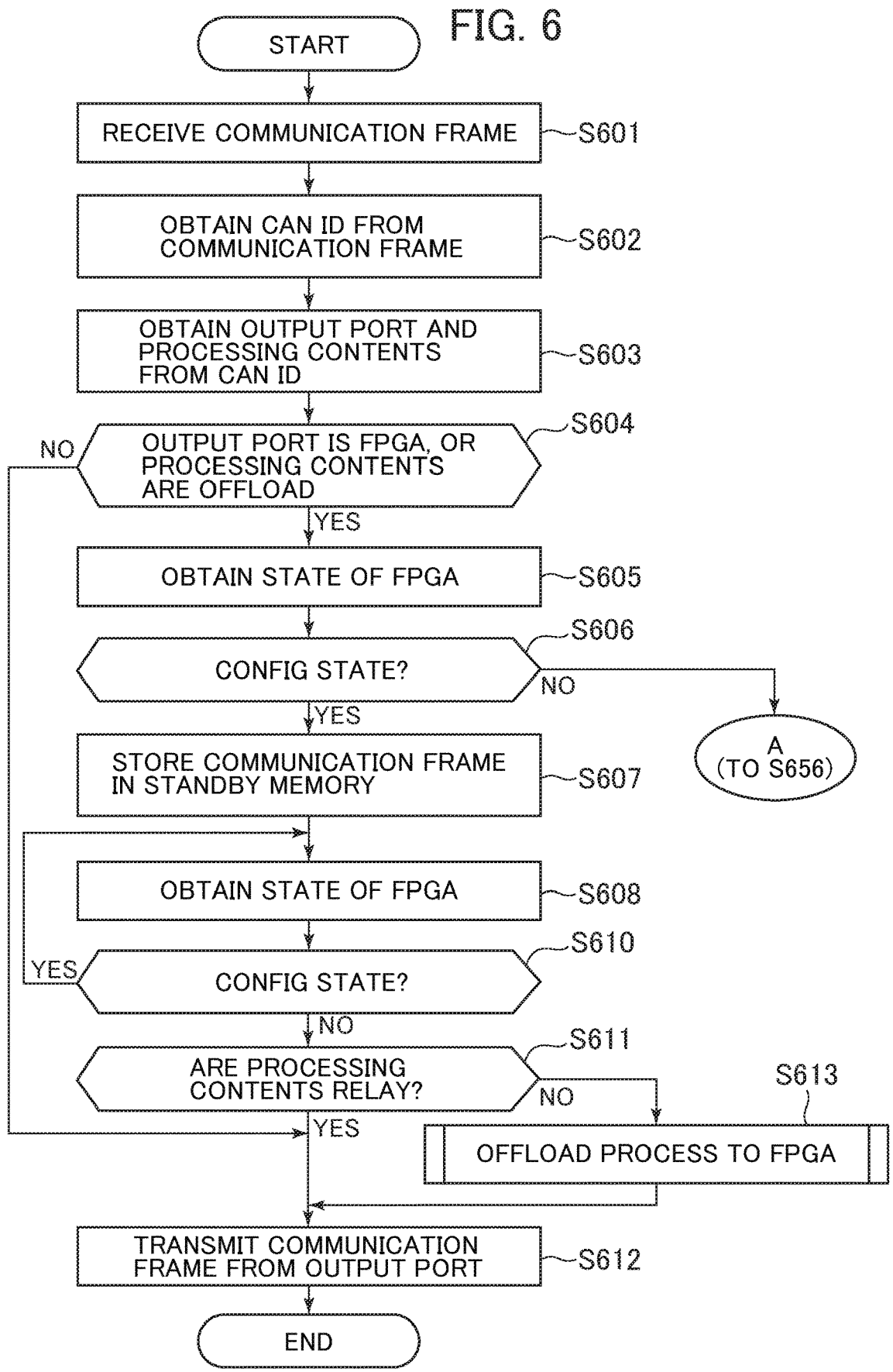
FIG. 6 is a flowchart illustrating the operation of a microcomputer according to the first embodiment.

FIG. 6 is a flowchart illustrating the process of the microcomputer 201 when the first CAN IF 202A or the second CAN IF 202B receives the CAN frame. The CPU, not illustrated, constituting the microcomputer 201 mainly executes each step described below.

In step S601, the communication frame is received from the first CAN IF 202A or the second CAN IF 202B. In subsequent step S602, the CAN ID of the received communication frame is obtained. In subsequent step S603, the flow table 205 is searched for on the basis of the obtained CAN ID, and the output port and the information processing item, that is, the processing contents, are designated.

In subsequent step S604, it is determined whether or not the output port and the information processing item designated in step S603 satisfy particular conditions. That is, it is determined whether the output port is the FPGA 250 or the offload is included in the information processing item. When it is determined that at least one of the conditions is satisfied, the routine goes to step S605, and it is determined that neither of the conditions is satisfied, the routine goes to step S612.

In step S605, the state of the FPGA 250 is obtained from the monitoring process 203. In subsequent step S606, it is determined whether or not the FPGA 250 is in the config state. When it is determined that the FPGA 250 is in the config state, the routine goes to step S607, and when it is determined that the FPGA 250 is not in the config state, the routine goes to step S656. It should be noted that the process in step S656 and thereafter will be described later with reference to FIG. 7.

In step S607, since the FPGA 250 is in the config state and cannot receive the communication frame, the process for responding to the config state, that is, the storage of the received communication frame in the standby memory, is performed. In subsequent step S608, like step S605, the state of the FPGA 250 is obtained from the monitoring process 203. In subsequent step S610, like step S606, it is determined whether or not the FPGA 250 is in the config state. When it is determined that the FPGA 250 is in the config state, the routine returns to step S608, and when it is determined that the FPGA 250 is not in the config state, the routine goes to step S611.

In step S611, it is determined whether or not the process for responding to configuration completion, that is, the information processing item designated in step S603, is the relay process. When it is determined that the information processing item is the relay process, the routine goes to step S612, and when it is determined that the information processing item is not the relay process, the routine goes to step S613. In step S612, the communication frame is transmitted from the output port, and the flowchart in FIG. 6 is ended. In step S613, the process is offloaded to the FPGA 250. In other words, in place of the microcomputer 201, the FPGA 250 is allowed to execute the encoding process, the decoding process, and the filtering process. Then, when the FPGA 250 completes these processes, the routine goes to step S612 to transmit the communication frame from the output port. The detail of step S613 will be described later with reference to FIG. 8.

Figure 7:
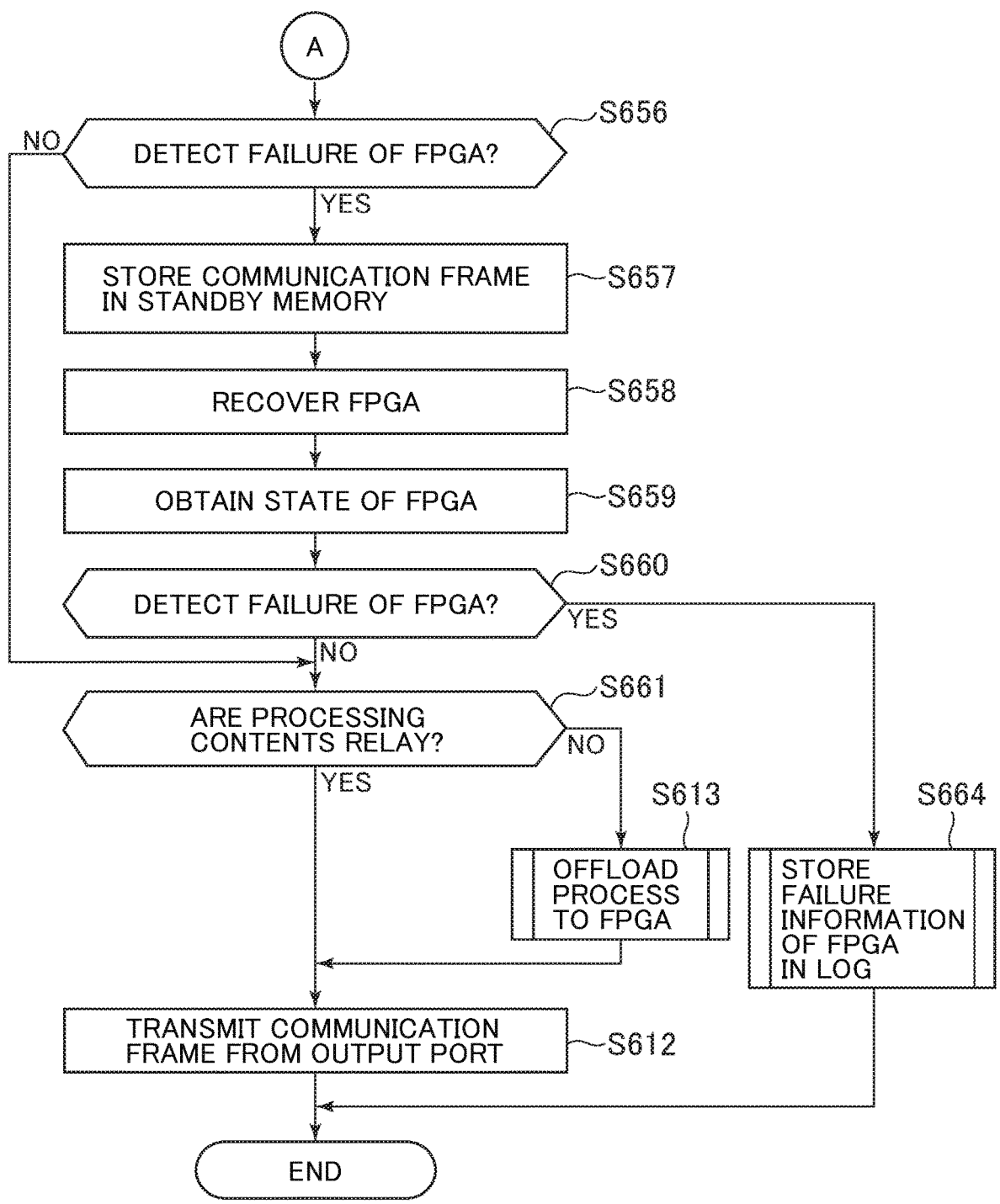
FIG. 7 is a flowchart illustrating a process when the negative determination is made in step S606 in FIG. 6.

FIG. 7 is a subroutine illustrating a process when the negative determination is made in step S606 in FIG. 6.

In step S656, from the obtaining of the state in step S605, it is determined whether or not the failure of the FPGA 250 has been detected. When it is determined that the failure has been detected, the routine goes to step S657, and when it is determined that the failure has not been detected, the routine goes to step S661. In step S657, like step S607, the communication frame is stored in the standby memory. In subsequent step S658, the recovery of the FPGA 250 is tried. In subsequent step 659, the state of the FPGA 250 is obtained again, and the routine goes to step S660.

In step S660, from the obtaining of the state in step S659, it is determined whether or not the failure of the FPGA 250 has been detected. When it is determined that the failure has been detected, the routine goes to step S664, and when it is determined that the failure has not been detected, the routine goes to step S661.

In step S661 executed when in step S656 or step S660, the negative determination is made, it is determined whether or not the information processing item designated in step S603 is the relay process. When it is determined that the information processing item is the relay process, the routine goes to step S612, and when it is determined that the information processing item is not the relay process, the routine goes to step S613. In step S612, like FIG. 6, the communication frame is transmitted from the output port, and the flowchart in FIG. 7 is ended. In step S613, like FIG. 6, the process is offloaded to the FPGA 250, and when the FPGA 250 completes these processes, the routine goes to step S612 to transmit the communication frame from the output port.

In step S664 executed when the positive determination is made in step S660, the failure information of the FPGA 250 is stored in the log, and the flowchart illustrated in FIG. 7 is ended. However, in this step, further, the failure may be notified to the external device connected to the on-vehicle gateway device 100. By immediately notifying the failure, the external device can make appropriate response, so that the safety can be improved.

Figure 8:
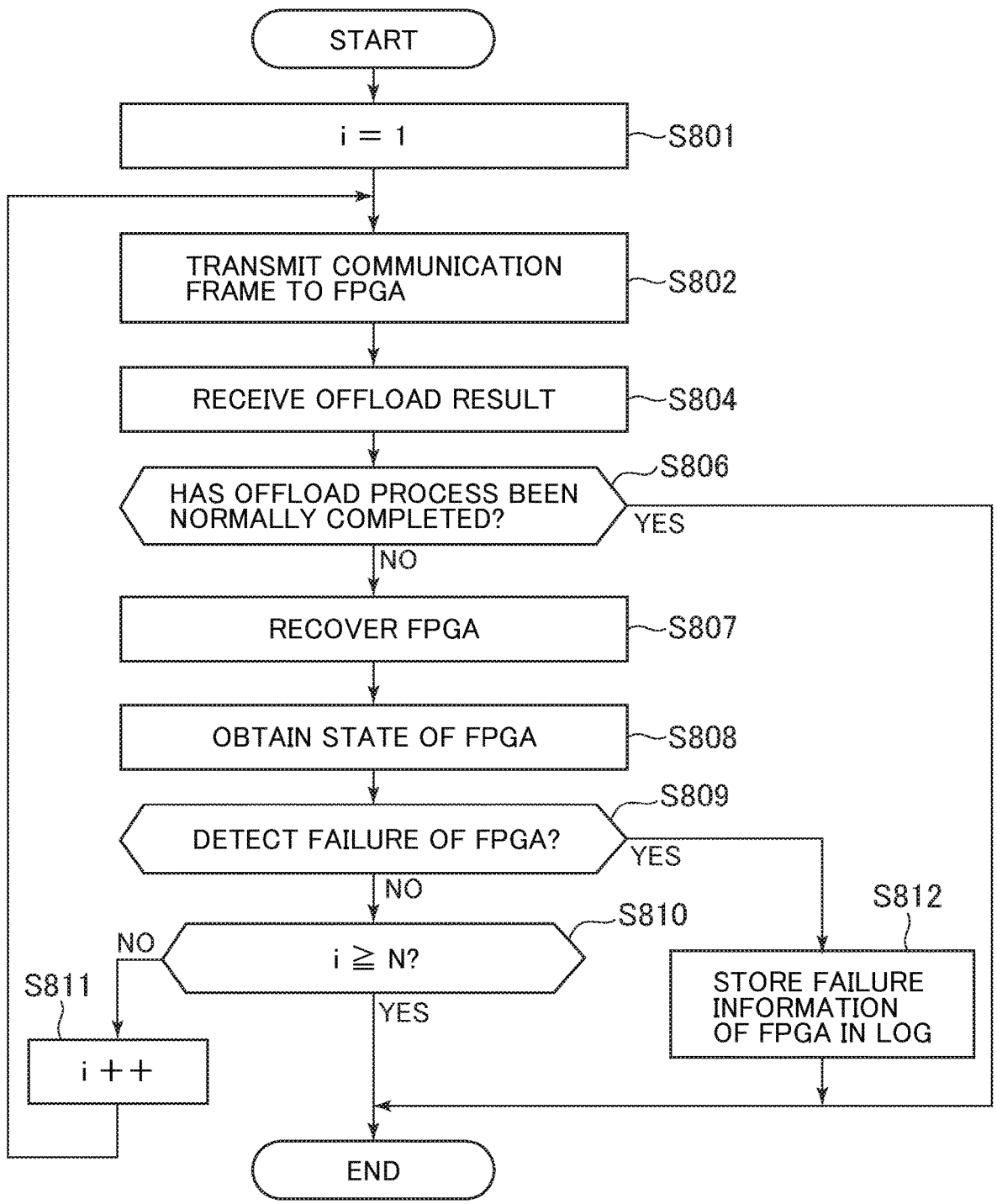
FIG. 8 is a flowchart illustrating the detail of step S613 in FIG. 6.

FIG. 8 is a flowchart of assistance in explaining a subroutine illustrating the detail of step S613 in FIGS. 6 and 7 in which the microcomputer 201 offloads the process to the FPGA 250.

In step S801, a loop counter i is initialized to 1, and the routine goes to step S802. This loop counter is used for repeatedly executing the process in step S802 and thereafter N times at the maximum, as described later. In step S802, the microcomputer 201 transmits the communication frame to be offloaded to the FPGA 250, and the routine goes to step S804. In step S804, the offload result is received from the FPGA 250, and the routine goes to step S806. However, in step S804, the microcomputer 201 is standby until the offload result is received from the FPGA 250.

In step S806, it is determined, on the basis of the offload result received in step S804, whether or not the offload process has been normally completed. When it is determined that the offload process has been normally completed, the flowchart in FIG. 8 is ended, and when it is determined that the offload process has not been normally completed, the routine goes to step S807. In step S807, the recovery of the FPGA 250 is tried. In subsequent step S808, the state of the FPGA 250 is obtained again, and the routine goes to step S809.

In step S809, it is determined, on the basis of the state of the FPGA 250 obtained in step S808, whether the failure of the FPGA 250 has been detected. When it is determined that failure of the FPGA 250 has been detected, the routine goes to step S812, and when it is determined that the failure of the FPGA 250 has not been detected, the routine goes to step S810. In step S810, it is determined whether or not the value of the loop counter i is equal to or more than N that is a defined number of repetitions. When it is determined that the i is equal to or more than N, the flowchart in FIG. 8 is ended, and when it is determined that the i is less than N, the routine goes to step S811. In step S811, the i is incremented, that is, the value of the i is increased by "1", and the routine returns to step S802.

In step S812 executed when the positive determination is made in step S809, the failure information of the FPGA 250 is stored in the log, and the flowchart illustrated in FIG. 8 is ended.

According to the first embodiment, the following operation and effect can be obtained.

(1) The microcomputer 201 is connected to the FPGA 250 that is a programmable logic circuit. The microcomputer 201 includes a monitoring unit monitoring the state of the FPGA 250, that is, the monitoring process 203, a storage unit storing a plurality of information processing items 303 executed by the microcomputer 201, that is, the flow table 205, and a processing unit executing a process on the basis of the state of the FPGA 250 and at least one information processing item selected from the plurality of information processing items 303 on the basis of a communication frame inputted to the FPGA 250, that is, the communication process 204.

Therefore, on the basis of, not only the identifier included in the communication frame, that is, the CAN ID, but also the state of the FPGA 250, the microcomputer 201 can select and execute the process with respect to the communication frame. That is, the process of the microcomputer 201 can be decided on the basis of the state of the FPGA 250 that is the logic circuit.

(2) The FPGA 250 is subjected to config to be capable of constituting the circuit constitution, and the monitoring process 203 monitors whether or not the FPGA 250 is in the config state. When the FPGA 250 is not in the config state (S606 in FIG. 6: NO), the communication process 204 executes the selected information processing item. When the FPGA 250 is in the config state (S606 in FIG. 6: YES), the communication process 204 executes the process different from the selected information processing item. The process different from the selected information processing item is the process for responding to the config state, that is, the process for storing the information transmitted to the FPGA 250 in the standby memory (S607 in FIG. 6).

Therefore, even when the microcomputer 201 starts the operation before the FPGA 250 completes the configuration, the microcomputer 201 executes the process for responding to the config state so as to be capable of appropriately processing the information transmitted to the FPGA 250. Thus, it is not necessary to wait for the start of the initialization of the microcomputer 201 until the configuration of the FPGA 250 is completed, so that the operation of the microcomputer 201 can be started early.

(3) The monitoring process 203 monitors whether or not the FPGA 250 is in the config completion state. When the FPGA 250 is in the config completion state, the communication process 204 allows the FPGA 250 to process at least part of the selected information processing item. That is, when the selected information processing item 303 is "relay", the FPGA 250 is allowed to process the relay process to the Ethernet, and when the offload process is included in the information processing item 303, the FPGA 250 is allowed to execute the offload process.

Therefore, when the config of the FPGA 250 is completed, the FPGA 250 can be allowed to execute the process according to the selected processing item.

(4) The monitoring process 203 monitors whether or not the FPGA 250 is in the config completion state. When the FPGA 250 is in the config state, the communication process 204 stores at least part of the communication frame (S607 in FIG. 6). When the FPGA 250 is changed from the config state to the config completion state, at least the stored part of the communication frame is transmitted to the FPGA 250 (S612 and S613 in FIG. 6).

Therefore, the information that should have been transmitted to the FPGA 250 in the config state of the FPGA 250 can be transmitted to the FPGA 250 after the config of the FPGA 250 is completed, and can be allowed to be processed by the FPGA 250.

(5) The monitoring process 203 monitors whether or not the FPGA 250 is failed. When the FPGA 250 is not failed, the communication process 204 executes the selected information processing item, and when the FPGA 250 is failed, the communication process 204 executes the process different from the selected information processing item. The process different from the selected information processing item is the process for coping with the failure, that is, the process for storing the communication frame in the standby memory (S657 in FIG. 7) and recovering the FPGA 250 (S658 in FIG. 7).

Therefore, when the FPGA 250 is failed, the communication frame received from the CAN network is temporarily stored, and is transmitted to the FPGA 250 after the recovery of the FPGA 250, so that retransmission due to the loss of the communication frame can be reduced, and the time required for the communication process can be shortened.

(6) The microcomputer 201 and the FPGA 250 are included in one on-vehicle gateway device 100 that connects the CAN and the Ethernet, that is, the IEEE802. 3 network. The microcomputer 201 is connected to the CAN network, and the FPGA 250 is connected to the IEEE802. 3 network.

The CAN network requiring the real-time properties has shorter response delay time allowed than the IEEE802. 3 network. Therefore, by connecting the microcomputer 201 that completes the initialization earlier than the FPGA 250, to the CAN network, the communication process can be executed within the required time. For example, even when the FPGA 250 is in the config state, the communication process from one CAN IF to the other CAN IF is enabled, and the communication process can be completed earlier without waiting for the config completion of the FPGA 250.

(7) The FPGA 250 is connected to the microcomputer 201.

Since the FPGA 250 cannot receive the communication frame until the configuration is completed, when the communication frame is transmitted before the configuration is completed, the communication frame disappears. However, the microcomputer 201 monitors the state of the FPGA 250, and executes the process for responding to the config state when the FPGA 250 is in the config state, so that the communication frame received from the CAN network in the config state is not lost.

First Modification

The on-vehicle gateway device 100 may use ASIC that is a logic circuit in which the circuit constitution is fixed, in place of the FPGA 250 that is a programmable logic circuit. When the ASIC is used for the on-vehicle gateway device 100 in place of the FPGA 250, the configuration is not required, so that in step S606 in FIG. 6, the negative determination is always made. However, following step S605, the routine may go to step S656 in FIG. 7.

According to the first modification, in the combination of the microprocessor that reads and executes the previously stored program and the ASIC in which the circuit constitution is fixed, the microprocessor can select the received communication frame according to the state of the failure of the ASIC.

Second Modification

In the first embodiment, the microcomputer 201 and the FPGA 250 are independent members, and are connected by the wire. However, the microcomputer 201 and the FPGA 250 may be integrated in the manufacturing process to be accommodated in one package. In this case, the microcomputer 201 and the FPGA 250 may be formed on different silicon dies, or may be integrally formed on the same silicon die. When the microcomputer 201 and the FPGA 250 are formed on different silicon dies, like the first embodiment, the monitoring bus 210 and the data bus 211 are wires and contacts. When the microcomputer 201 and the FPGA 250 are formed on the same silicon die, the monitoring bus 210 and the data bus 211 do not have clear physical constitutions. Also, in this case, the microcomputer 201 and the FPGA 250 are always in connected state.

Third Modification

In the first embodiment, both of the determination of whether or not the FPGA 250 is in the config state and the determination of whether or not the FPGA 250 is failed are performed. However, only one of such the determinations may be performed. That is, in the case of performing only the former determination, when in step S606 in FIG. 6, the negative determination is made, the routine goes to step S661. And, in the case of performing only the latter determination, step S656 in FIG. 7 is executed following step S605 in FIG. 6.

Fourth Modification

The monitoring process 203 may determine whether or not the configuration of the FPGA 250 has been completed as follows. That is, after the signal indicating the configuration completion is outputted from the FPGA 250, when the reset signal of the FPGA 250 is normally released, the monitoring process 203 may determine that the configuration has been completed. Specifically, when the signal indicating the configuration completion is simply outputted, without determining in step S606 in FIG. 6 that the config has been completed, the negative determination may be made in step S606 at the time of further normally releasing the reset signal. This reset signal is the signal outputted from the FPGA 250 via the monitoring bus 210 to the microcomputer 201, and is released after the preparation of the operation of the FPGA 250 is completed.

Fifth Modification

In the first embodiment, the microcomputer 201 transmits the entire communication frame to be processed to the FPGA 250 for the offload process, but may extract only the data necessary for the offload process from the communication frame to transmit the extracted data to the FPGA 250. Like this, for the result of the offload process, the FPGA 250 may transmit, of the information included in the communication frame, only the information that has been processed, not the entire communication frame, to the microcomputer 201.

According to the fifth modification, since the entire communication frame is not transmitted and received, the communication data amount can be reduced, and the time to wait for the data transfer can be improved by the reduction in the data transfer time and the release of the band load between the FPGA 250 and the microcomputer 201, so that the communication processing time of the on-vehicle gateway device 100 can be shortened.

Sixth Modification

In the first embodiment, the process for responding to the config state is the storage of the communication frame in the standby memory. However, the process for responding to the config state is not limited to this. For example, the counter provided in the communication process 204 may be counted up and store its value in the standby memory. In this case, the value of the counter is used as the value indicating the number of communication frames received in the config state. Also, the process for responding to the config state may count up the counter and discard the received communication frame. Further, the process for responding to the config state may discard the received communication frame, and transmit the retransmission request after the elapse of a predetermined time.

Seventh Modification

In the first embodiment, the process for responding to the config completion transmits the communication frame stored in the standby memory to the FPGA 250 for the offload process or the relay process with respect to the communication frame. However, the process for responding to the config completion is not limited to this. For example, the process for responding to the config completion may transmit the retransmission request of the communication frame. Also, when the count-up of the counter is included in the process for responding to the config state, the process for responding to the config completion may be the process using its count value.

Second Embodiment

A second embodiment of the on-vehicle system will be described with reference to FIGS. 9 to 11. In the following description, the same components as the first embodiment are indicated by the same reference numerals, and the different points will be mainly described. The points that are not particularly described are the same as the first embodiment. This embodiment is different from the first embodiment mainly in that the function is degraded according to the degree of the failure of the FPGA.

Figure 9:
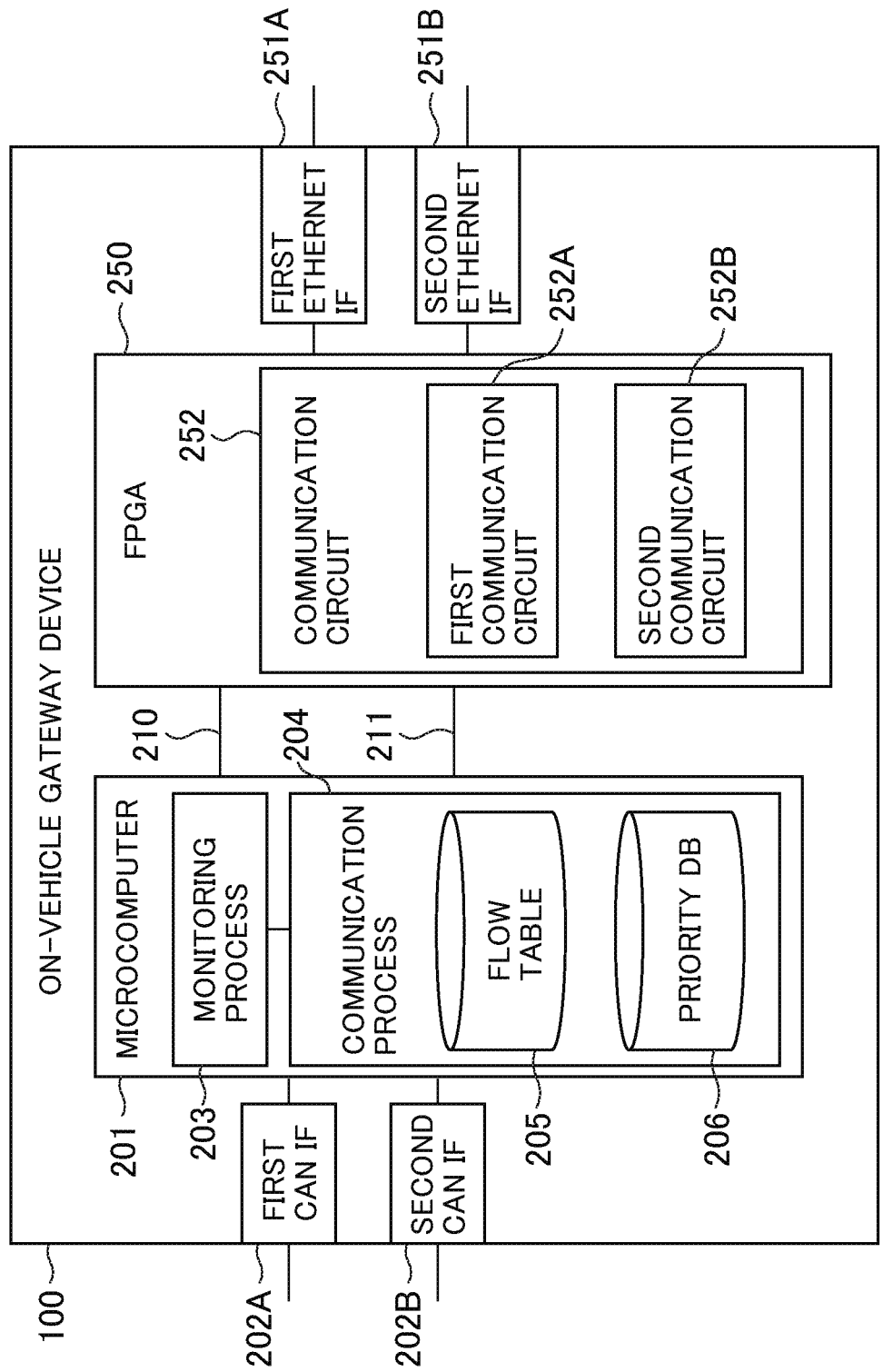
FIG. 9 is a block diagram of the on-vehicle gateway device according to a second embodiment.

FIG. 9 is a block diagram of the on-vehicle gateway device 100 according to the second embodiment.

In the microcomputer 201, the communication process 204 further includes a priority DB 206, in addition to the constitution of the first embodiment. The priority DB 206 is a database that stores information about the priority of communication, and will be described later in detail. Also, the monitoring process 203 includes the function of discriminating the degree of the failure of the FPGA 250. The degree of the failure can be discriminated in at least three stages of no failure, partial failure, and overall failure. The no failure is the state where the FPGA 250 is not failed, the partial failure is the state where part of the FPGA 250 has some problems and has more deteriorated processing ability than the no failure, and the overall failure is the state where the FPGA 250 cannot perform processing at all.

Further, the communication process 204 also includes the function of calculating the load acceptance capacity of the FPGA 250 as load acceptance capacity prediction. The calculation of the load acceptance capacity prediction is achieved by a method for previously measuring the load for each information processing item to store the load in the communication process 204, a method for predicting the load from the size of the communication frame and the like, and the like. The load acceptance capacity prediction is expressed as, for example, an integer between 0 and 100, and represents that as the numerical value is larger, the acceptance capacity that accepts the load is higher. At the initial value of the load acceptance capacity prediction, that is, at the time of the completion of the initialization of the FPGA 250, when the FPGA 250 is not failed, the load acceptance capacity prediction is calculated as "100" that is the maximum value. Also, the program stored in the ROM, not illustrated, included in the microcomputer 201 is different from the first embodiment, and its operation is different, as descried later.

The FPGA 250 includes, in place of the communication circuit 252 according to the first embodiment, a first communication circuit 252A and a second communication circuit 252B. The first communication circuit 252A and the second communication circuit 252B are the same in constitution and function as the communication circuit 252 according to the first embodiment. That is, although not illustrated in FIG. 9, both of the first communication circuit 252A and the second communication circuit 252B each include the FDB 253 and the conversion DB 254. Each of the first communication circuit 252A and the second communication circuit 252B may have the same processing ability as the communication circuit 252, or may have a lower processing ability than the communication circuit 252. The first communication circuit 252A and the second communication circuit 252B exhibit the function of the FPGA 250 by typically sharing and executing the process.

Also, when one of the first communication circuit 252A and the second communication circuit 252B cannot be operated due to failure, the other of the first communication circuit 252A and the second communication circuit 252B can even singly exhibit the function of the FPGA 250. For example, typically, the communication frames inputted to the FPGA 250 are alternately processed, the inputted first communication frame is processed by the first communication circuit 252A, and the inputted second communication frame is processed by the second communication circuit 252B. Then, for example, when the first communication circuit 252A is failed, the second communication circuit 252B processes all the inputted communication frames. However, since the processing ability of the FPGA 250 is lowered due to failure, the function is degraded, as described later, and only the communication frame that satisfies the condition is processed. It should be noted that the function sharing of the first communication circuit 252A and the second communication circuit 252B in normal operation is an example, and the first communication circuit 252A and the second communication circuit 252B may share the function in any manner.

The failure detection circuit, not illustrated, included in the FPGA 250 monitors the operation state of the first communication circuit 252A and the second communication circuit 252B, and when detecting a failure, transmits the occurrence of the failure to the microcomputer 201 via the monitoring bus 210. For example, when the occurrence of the failures of both of the first communication circuit 252A and the second communication circuit 252B is transmitted, the monitoring process 203 determines this as the overall failure. When the occurrence of the failure of one of the first communication circuit 252A and the second communication circuit 252B is transmitted, the monitoring process 203 determines this as the partial failure. When the occurrence of the failures of both of the first communication circuit 252A and the second communication circuit 252B is not transmitted, the monitoring process 203 determines this as the no failure.

The Priority DB

Figure 10:
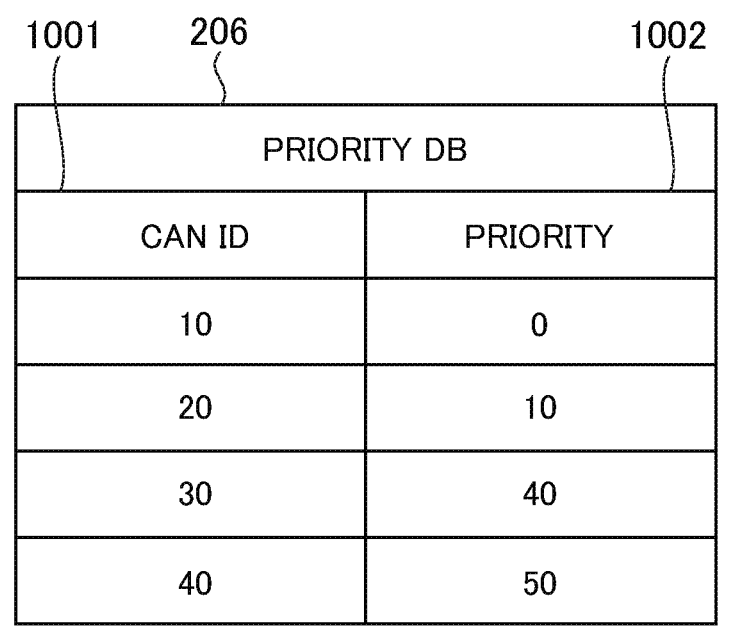

FIG. 10 is a diagram illustrating an example of the priority DB 206. The priority DB 206 includes a plurality of records having two fields. The fields that the priority DB 206 has are a CAN ID 1001 and priority 1002. The CAN ID 1001 represents the CAN ID included in the header of the CAN frame inputted from each of the first CAN IF 202A and the second CAN IF 202B, and corresponds to the CAN ID 301 in the flow table 205 in FIG. 3. The priority 1002 is an integer between 0 and 100 that represents that for the information processing item 303 in the flow table 205 associated with the CAN ID indicated by the CAN ID 1001, as the numerical value is smaller, the priority of the process is higher. Although described later in detail, only when the load acceptance capacity prediction of the FPGA 250 is higher than the priority, the information processing item 303 in the flow table 205 is executed. That is, the priority DB 206 represents a threshold value that is the processing condition with respect to each of the information processing items 303 in the flow table 205.

Flowchart

Figure 11:
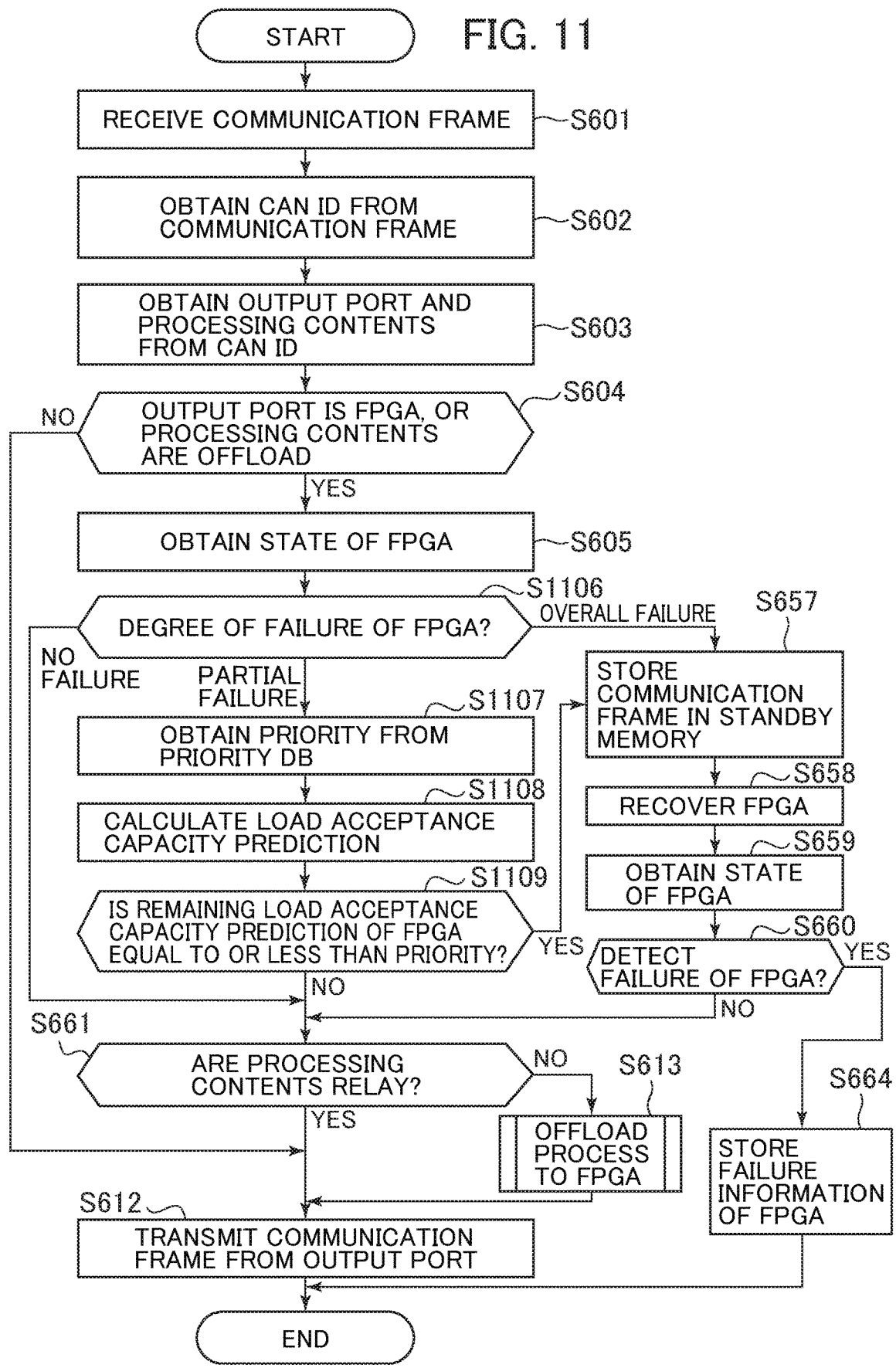
FIG. 11 is a flowchart illustrating the operation of the microcomputer according to the second embodiment.

FIG. 11 is a flowchart illustrating the operation of the microcomputer according to the second embodiment. In FIG. 11, the steps for performing the same process as FIGS. 6 and 7 are indicated by the same step numbers, and the description thereof is omitted. It should be noted that as described above, immediately after the start-up of the on-vehicle gateway device 100, the load acceptance capacity prediction is calculated as the maximum value, for example, 100. The the CPU, not illustrated, constituting the microcomputer 201 mainly executes each step described below.

After the start of the flowchart illustrated in FIG. 11, steps S601 to S605 are the same as FIG. 6, and the description thereof is omitted. In step S1106 executed following step S605, the failure level of the FPGA 250 outputted by the monitoring process 203 is determined. At the time of the determination as the no failure, that is, when it is determined that the FPGA 250 is not failed, the routine goes to step S661. When it is determined that the FPGA 250 is partially failed, the routine goes to step S1107. When it is determined that the overall FPGA 250 is failed, the routine goes to step S657.

In step S1107, the priority DB 206 is referred to on the basis of the CAN ID obtained in step S602 to obtain the priority. For example, in the case where the priority DB 206 is the value illustrated in FIG. 10, when the CAN ID is "30", "40" is obtained as the priority. In subsequent step S1108, the load acceptance capacity prediction is calculated on the basis of the degree of the failure of the FPGA 250 and the contents of the process executed by the FPGA 250, and the routine goes to step S1109. In step S1109, the priority obtained in step S1107 and the load acceptance capacity prediction calculated in step S1108 are compared in magnitude, and it is determined whether or not the value of the load acceptance capacity prediction is equal to or less than the value of the priority. When it is determined that the value of the load acceptance capacity prediction is equal to or less than the value of the priority, the routine goes to step S657. When it is determined that the value of the load acceptance capacity prediction is more than the value of the priority, the routine goes to step S661.

In the case of the determination as the overall failure in step S1106, and when the positive determination is made in step S1109, like the first embodiment, steps S657 to S660 are executed. It should be noted that in step S658, the overall FPGA 250 may be recovered, but only the part in which the failure has been detected may be recovered to perform the configuration. Further, so-called dynamic reconfiguration that performs the configuration while the FPGA 250 is operated may be performed. In the case of the determination as the overall failure or the partial failure in step S660, the routine goes to step S664, and in the case of the determination as the no failure, the routine goes to step S661. The process in step S661 and thereafter is the same as the first embodiment, and the description thereof is omitted.

According to the second embodiment, the following operation and effect can be obtained.

(1) The monitoring process 203 monitors the degree of the failure of the FPGA 250. When the FPGA 250 is failed, the communication process 204 changes the process executed according to the degree of the failure. The process according to the degree of the failure of the FPGA 250 determined by the monitoring process 203 is executed. For example, in the case of the determination as the no failure, the communication process 204 transmits the received communication frame to the FPGA 250. In the case of the determination as the partial failure, the communication process 204 performs the process on the basis of the comparison of the priority and the load acceptance capacity prediction. In the case of the determination as the overall failure, the communication process 204 stores the communication frame in the standby memory to recover the FPGA 250. Therefore, the microcomputer 201 can execute the process according to the degree of the failure of the FPGA 250.

(2) The microcomputer 201 stores the priority database 206 that represents the threshold value that is the processing condition with respect to each of the plurality of information processing items 303.

When the FPGA 250 is partially failed, the communication process 204 obtains the threshold value with respect to the selected information processing item 303 on the basis of the priority database 206, and decides, on the basis of the obtained threshold value and the load acceptance capacity of the FPGA 250, whether or not the selected information processing item 303 is executed.

Therefore, at the time of the failure of the FPGA 250, the process can be decided according to the CAN ID of the received communication frame in consideration of the load of the FPGA 250.

(3) The microcomputer 201 stores the priority database 206 in which the identifier of the communication frame and the threshold value that is the processing condition, that is, the priority, are associated. The monitoring process 203 determines the degree of the failure of the FPGA 250. When the communication process 204 determines, on the basis of the CAN ID of the received communication frame and the flow table 205, that at least part of the received communication frame is required to be transmitted to the FPGA 250 (step S604 in FIG. 11: YES), and determines that the degree of the failure of the FPGA 250 determined by the monitoring process 203 is the partial failure (step S1106 in FIG. 11: the partial failure), the following process is performed. That is, the priority is obtained on the basis of the identifier of the received communication frame and the priority database 206 (step S1107), and it is decided, on the basis of the priority and the load acceptance capacity prediction, whether or not the FPGA 250 is allowed to execute the process about the communication frame (step S1108).

Therefore, at the time of the failure of the FPGA 250, the information processing item stored in the flow table 205 is selected and executed on the basis of the CAN ID of the received communication frame, the degree of the failure, and the priority DB 206, so that the limit of the communication process can be minimized, and thus, the communication process can be executed within the required time. Specifically, for example, even when the FPGA 250 is failed, and when such the failure is the partial failure, the communication process of the communication frame having high priority can be continued.

First Modification of Second Embodiment

Also in the second embodiment, like the first embodiment, the microcomputer 201 determines whether or not the FPGA 250 is in the config state, and when determining that the FPGA 250 is in the config state, may execute the process for responding to the config state. Specifically, the process of step S606 and thereafter in FIG. 6 may be executed following step S605 in FIG. 11, and when in step S606, it is determined that the FPGA 250 is not in the config state, the process in step S1106 and thereafter in FIG. 11 may be executed.

Second Modification of Second Embodiment

When the microcomputer 201 does not include the priority DB 206, and determines that the degree of the failure of the FPGA 250 is the partial failure, only part of the communication frame may be transmitted to the FPGA 250. For example, in place of step S1107 to step S1109 in FIG. 11, the presence or absence of the process may be randomly decided, and only when it is determined that the process is performed, the routine may go to step S661, and otherwise, the routine may go to step S657. Further, the probability to perform the process may be increased or decreased according to the degree of the failure of the FPGA 250, and in that case, as the degree of the failure is lower, the probability to perform the process becomes higher. Also, it may be determined, on the basis of the contents of the process allowed to be performed by the FPGA 250 and the magnitude of the processing load, whether or not the communication frame is transmitted to the FPGA 250.

Third Modification of Second Embodiment

In the second embodiment, the load acceptance capacity prediction is calculated on the basis of the communication frame transmitted from the microcomputer 201 to the FPGA 250 and its processing contents. However, the degree of the failure of the FPGA 250 may be further considered, and when the FPGA 250 has the function of outputting the current load, its output may be used.

Fourth Modification of Second Embodiment

In the second embodiment, in place of performing the classification by case according to the degree of the failure of the FPGA 250, the degree of the failure of the FPGA 250 may be reflected in the comparison of the load acceptance capacity prediction and the priority. For example, in the flowchart in FIG. 11, the routine goes to step S1107 following step S605. Then, at least one of the load acceptance capacity prediction and the priority is adjusted so that when the degree of the failure of the FPGA 250 is the no failure, the negative determination is made in step S1108, and when the degree of the failure of the FPGA 250 is the overall failure, the positive determination is made in step S1108, and the routine goes to step S1108.

For example, when the degree of the failure of the FPGA 250 is the no failure, regardless of the execution result in step S1107, the priority is set to a value smaller than the minimum value of the load acceptance capacity prediction, for example, "−1", or the load acceptance capacity prediction is set to a value larger than the maximum value of the priority, for example, "101".

Fifth Modification of Second Embodiment

The monitoring process 203 may determine the degree of the failure of the FPGA 250 only on the basis of whether or not each of the first communication circuit 252A and the second communication circuit 252B is operated. In this case, the determination as the partial failure in step S1106 in FIG. 11 is made when only one of the first communication circuit 252A and the second communication circuit 252B is operated. At this time, the maximum value of the load acceptance capacity prediction is the previously set value, for example, "50".

The program of the microcomputer 201 is stored in the ROM, not illustrated, but the program may be stored in the nonvolatile memory, not illustrated, included in the microcomputer 201. Also, the microcomputer 201 may include the input-output interface, not illustrated, and the program may be read from another device via a medium that can be used by the input-output interface and the microcomputer 201, when necessary. Here, the medium is referred to as, for example, a storage medium that can be provided to and removed from the input-output interface, or a communication medium, that is, a network, for example, a wired network, a wireless network, and an optical network, or a carrier wave and a digital signal carried on the network. Also, part or all of the function achieved by the program may be achieved by the hardware circuit and the FPGA.

The above respective embodiments and modifications may be respectively combined.

In the above, various embodiments and modifications have been described, but the present invention is not limited to these contents. Other forms considered within the range of the technical idea of the present invention are also included within the range of the present invention.

The disclosed contents of the following application given as the basis of priority are incorporated herein by reference.

Japanese Unexamined Patent Application No. 2016-252782 (filed on Dec. 27, 2016)

LIST OF REFERENCE SIGNS

100 . . . On-vehicle gateway device
201 . . . Microcomputer
203 . . . Monitoring process
204 . . . Communication process
206 . . . Priority database

The invention claimed is:

1. A microcomputer that is connected to a logic circuit comprising:
   a monitoring unit monitoring a state of the logic circuit;
   a storage unit storing a plurality of information processing items executed by the microcomputer; and
   a processing unit executing a process on the basis of the state of the logic circuit and at least one information processing item selected from the plurality of information processing items on the basis of a communication frame inputted to the microcomputer,
   wherein the logic circuit is subject to configure to be capable of constituting a circuit constitution,
   wherein the monitoring unit monitors whether or not the logic circuit is in configure state,
   wherein when the logic circuit is not in the configure state, the processing unit executes a first process including the selected information processing item,
   wherein when the logic circuit is in the configure state, the processing unit executes a second process that is different from the selected information processing item,
   wherein the microcomputer and the logic circuit are included in one gateway device that connects a controller area network (CAN) with an Ethernet, and
   wherein the microcomputer is connected to the CAN, and the logic circuit is connected to the Ethernet.

2. The microcomputer according to claim 1,
   wherein the monitoring unit monitors whether or not the logic circuit is in configure completion state, and
   wherein when the logic circuit is in the configure completion state, the processing unit allows the logic circuit to process at least part of the selected information processing item.

3. The microcomputer according to claim 1,
   wherein the monitoring unit monitors whether or not the logic circuit is in the configure completion state, and
   wherein when the logic circuit is in the configure state, the processing unit stores at least part of the communication frame, and when the logic circuit is changed from the configure state to the configure completion state, at least the stored part of the communication frame is transmitted to the logic circuit.

4. The microcomputer according to claim 1,
   wherein the monitoring unit monitors whether or not the logic circuit is failed,
   wherein when the logic circuit is not failed, the processing unit executes the first process including the selected information processing item, and
   wherein when the logic circuit is failed, the processing unit executes the second process different from the selected information processing item.

5. The microcomputer according to claim 4,
   wherein the monitoring unit monitors a degree of the failure of the logic circuit, and
   wherein when the logic circuit is failed, the processing unit changes a process executed according to the degree of the failure.

6. The microcomputer according to claim 5,
   wherein the storage unit further stores a priority table that represents a threshold value that is a processing condition with respect to each of the plurality of information processing items, and
   wherein when the logic circuit is partially failed, the processing unit obtains the threshold value with respect to the selected information processing item on the basis of the priority table, and decides, on the basis of the obtained threshold value and the load acceptance capacity of the logic circuit, whether or not the selected information processing item is executed.

* * * * *